United States Patent
Houghton-Larsen et al.

[11] 3,821,434
[45] June 28, 1974

[54] METHOD FOR PRODUCING A COFFEE CONCENTRATE

[75] Inventors: Erik Houghton-Larsen, Fredensborg; Ove Emil Hansen, Vaerlose, both of Denmark

[73] Assignee: Aktieselskabet Niro Atomizer, Soborg, Denmark

[22] Filed: June 25, 1971

[21] Appl. No.: 156,747

[30] Foreign Application Priority Data
July 1, 1970 Denmark .......................... 3418/70
July 1, 1970 Denmark .......................... 3419/70

[52] U.S. Cl. ................. 426/193, 426/384, 426/471
[51] Int. Cl. ............................................. B01d 9/04
[58] Field of Search ............ 62/58; 34/5; 99/199, 71

[56] References Cited
UNITED STATES PATENTS

| | | | |
|---|---|---|---|
| 2,751,687 | 6/1956 | Colton | 99/71 |
| 2,888,349 | 5/1959 | Morrow et al. | 99/71 |
| 2,889,226 | 6/1959 | Hinkley | 99/71 |
| 2,897,084 | 7/1959 | Peebles | 99/71 |
| 3,283,522 | 11/1966 | Ganiaris | 62/58 |
| 3,319,344 | 5/1967 | Sachsel et al. | 99/71 |
| 3,431,655 | 3/1969 | Grover et al. | 34/5 |
| 3,443,963 | 5/1969 | Simon et al. | 99/199 |
| 3,486,907 | 12/1969 | Hair et al. | 99/199 |
| 3,565,635 | 2/1971 | Mahlmann | 99/199 |
| 3,573,060 | 3/1971 | Casten et al. | 99/71 |

Primary Examiner—Norman Yudkoff
Assistant Examiner—R. T. Foster
Attorney, Agent, or Firm—Sughrue, Rothwell, Mion, Zinn & Macpeak

[57] ABSTRACT

A method for producing a high grade frozen coffee extract in an economical way by extracting with a yield of between 14–29 percent and deep freezing said extract. The residual can be used for making coffee powder, e.g. by spray-drying.

Different batches of coffee concentrate can be frozen and packed in different packages according to strength and taste offering the consumer a free choice.

10 Claims, 1 Drawing Figure

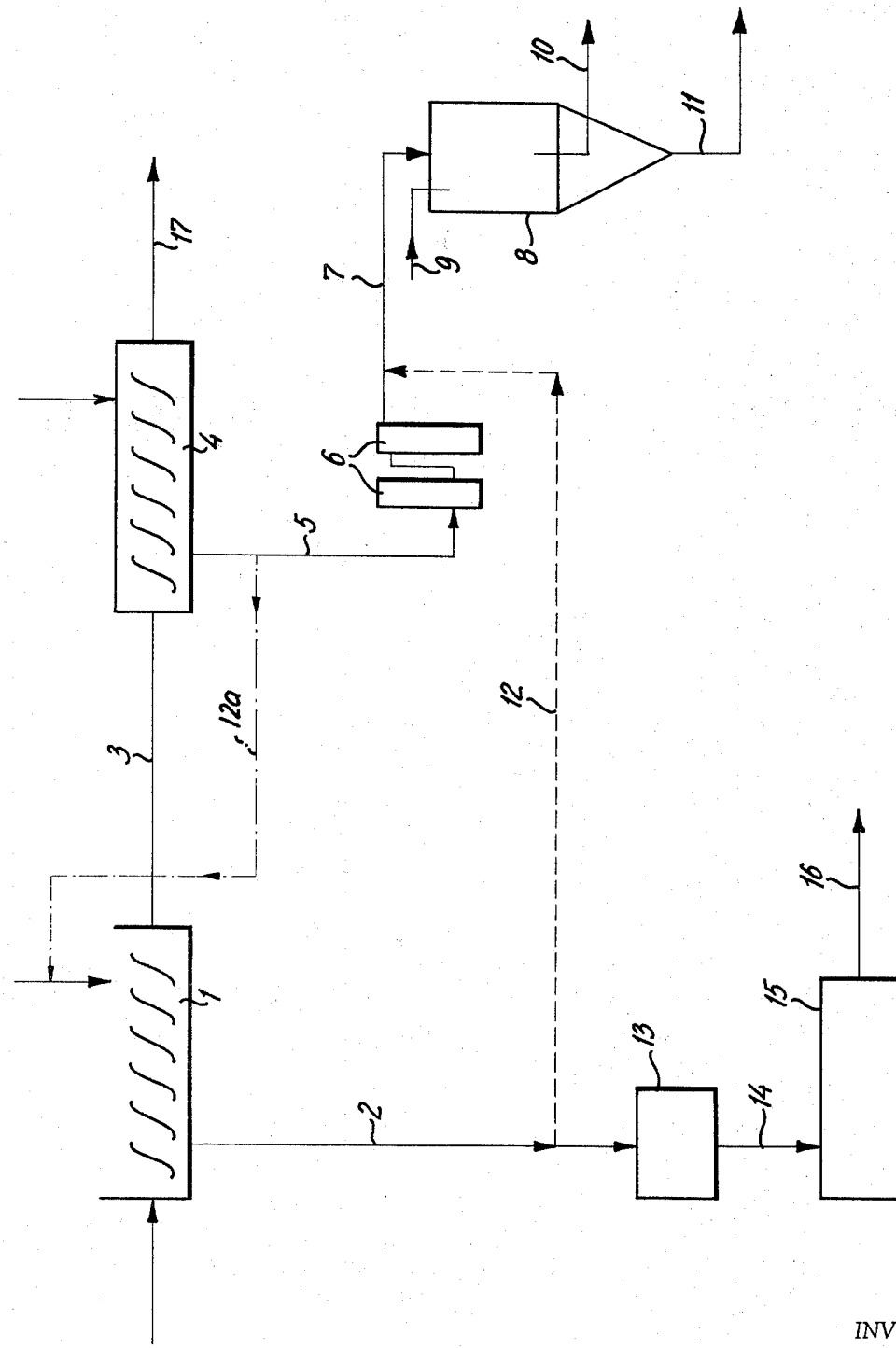

METHOD FOR PRODUCING A COFFEE CONCENTRATE

The invention relates to a method for producing a coffee concentrate.

The object of the invention is to produce a coffee product in the form of a concentrated extract which by being diluted with water can be made into a drink quite similar to the coffee prepared in the traditional manner in the household.

Since the concentrate is not subjected to a drying process like that which is applied in the production of coffee powder it is possible, in contradistinction to what applies to coffee powder, to all intents and purposes to avoid loss of flavour completely.

Making coffee by means of a coffee concentrate is easier than making coffee in the traditional manner and therefore the coffee concentrate can be sold at a somewhat higher price per cup of coffee than when the coffee is made in the traditional way.

However, a profitable production of such a product at a reasonable price is subject to the condition that the extraction of the roasted and ground coffee beans is carried to a rather high limit, which means the inclusion of a good deal of unwanted flavouring constituents which cause the coffee made from the concentrate to have a poorer taste than coffee made in the traditional way. For this reason, such coffee concentrates did not succeed in gaining ground.

If one rests contented with extracting with a yield of 30–35 percent a coffee concentrate would be obtained from which coffee can be made with properties that, by and large, are satisfactory, but on the other hand the price would become so high that no considerable sale of the product can be expected.

The present invention is characterized in that roasted and ground coffee beans are extracted with a yield of 14–29 percent, and that the extract is cooled down to a temperature below its point of solidification, after which the frozen product is packed in a packing suited for storing deep-frozen products.

From the above statements it will appear that by this method a coffee concentrate is obtained from which it is possible to make particularly excellent coffee, the low yield of the extraction ensuring that the product, to all intents and purposes, is completely devoid of undesirable flavour, and in practice it has in fact proved that from this concentrate coffee can be made which tastes at least just as good as that made in the traditional way. However, the above statements might lead to the belief that by this means a still more expensive product, which consequently would be unsaleable in practice, would be obtained, but this is not the case, and this is connected with the fact that, when the extraction is carried no further than to a yield of 25 percent, there are still so many valuable substances left that, by an ensuing extraction, an extract can be obtained which can form the basis for the production of coffee powder with an excellent result by spray-drying into an instant coffee powder. In this way it is possible to carry out the production so that it becomes profitable even at a comparatively low price for the coffee concentrate produced as a consequence of the possibility of an economic utilization of the residual products.

It has been found that from the residual products of the first extraction stage it is possible to obtain by further extraction and spray-drying an instant coffee powder which gives a brew whose flavour comes in full up to the flavour of coffee prepared from spray-dried products in which one has also used the first 14–29 percent of the solids in the roasted and ground coffee beans, provided, of course, that the same quality of coffee beans has been used as a basis in both cases.

This is apparently due to the fact that the flavouring constituents which give the brew made of instant coffee powder its characteristic flavour differing from that of conventional coffee, whereby is meant a brew from roasted and ground coffee beans, are essentially to be found in the last half of the solids and aroma constituents extracted in an amount up to 40–45 percent, whereas the aroma constituents which are to be found in the first 14–29 percent and which to a substantial extent give the conventional coffee its distinctive character partly disappear by the drying, and as far as the rest is concerned, are to a substantial extent overpowered by the special aroma constituents which are to be found in the last half and which normally do not appear in conventional coffee or, at any rate, only appear in a quite small quantity, in the first place because in making coffee in the household in the traditional way one does not perform the extraction nearly so far as it is, for economical reasons, necessary to do in the preparation of coffee powder.

Thus, one obtains by the spray-drying of the extract from the residual products from stage 1 a coffee powder which can come up to the coffee powders prepared by known methods, but at substantially lower production costs, since the first part of the extract is used for the more valuable utilization according to the invention.

In some cases it may, however, be advantageous to remove minor portions of the first extract and use such minor portions as an additive before the drying in the preparation of the coffee powder, or for the preparation of a powder to add to the coffee powder.

Thus, for instance, in cases where it is necessary for obtaining a desired quality of coffee powder that the first extraction is only performed until 20 percent, while the following 20 percent are used for the preparation of the coffee powder, it will often be possible to perform, instead, the first extraction up to 25 percent and use a fifth or maybe a smaller portion thereof for preparing the coffee powder together with the extract with the subsequent 15 percent.

It is of importance that use is made of spray-drying for the preparation of the coffee powder from the extract, as more flavourdeteriorating ingredients are thereby removed than by other methods.

It will be possible to prepare a coffee powder of low caffeine content to the extent which might be desirable by just fixing the yield of the first extraction sufficiently high.

Since, however, a certain caffeine content is generally desired, it will in most cases be preferable that the yield of the first extraction is not chosen too high, or that one compensates for the caffeine loss by adding a minor fraction of the first extract or by adding corresponding minor quantities of caffeine extracted in more or less pure and concentrated form from the first extract.

It is to be pointed out that it is known to perform a multi-stage extraction with a view to producing two different products, but in the known case one proceeds in the way that the extraction is performed in three successive stages, where the extract from the second stage is used for producing a coffee powder of a certain grade, while the extract from the first stage is mixed with the extract from the third stage and is used for producing a coffee powder of a somewhat poorer grade. No improvement of the economy is, however, achieved by this method. Certainly, the powder of the highest grade may possibly be sold at a somewhat higher price than the normal, but, on the other hand, the powder of the second grade will become considerably poorer than normal coffee powder and therefore has to be sold at a lower price, and this can, due to the greater quantity of this second-grade product, hardly be balanced by the higher price of the first-grade product.

The extraction should be performed with as little water as possible, but it is, moreover, in accordance with the invention expedient that the extract is, before the freezing process, concentrated at a temperature below 160° F. In this case it is particularly expedient that the concentration is performed as a freeze-concentration.

An especially excellent product is obtained according to the invention by the extraction being performed to a total solids content of below 20 percent, and that the concentration is carried to a total solids content of 15–40 percent.

The cooling can be performed by the extract being in the form of drops introduced into liquid nitrogen. By this means, the extract will be present in the form of deep-frozen beads which in a simple way can be packed in suitable batches. Different packings may be used corresponding to certain different numbers of cups of coffee or different batches of different taste and strength.

The drops are preferably produced of such a size that in their frozen state they have a diameter of 3–5 millimetres.

In the following the invention will be explained in greater detail with reference to the drawing which diagrammatically shows a plant for carrying out the method according to the invention.

The roasted and ground coffee beans are introduced into a trough 1 of a known type, preferably a open trough. A suitable quantity of water is at the same time supplied to this trough, and the trough is heated in a known manner by means of a water jacket.

From this trough 1 the extract is discharged through a line 2, while the residue from the extraction is discharged through a line 3.

Through the line 3 the residue from the extraction is fed to another trough 4 which is likewise of a kind known, but of the closed type. An additional quantity of water is supplied to this trough 4, and the trough is heated to a relatively high temperature by means of a steam jacket or a pressurized-water jacket.

From this trough 4 an extract is discharged through a line 5, while the residue from the extraction or the coffee waste is discharged through a line 17. The extract passes through the line 5 to a known concentration stage 6 which, e.g., may consist of an evaporator.

The concentrated extract is led through a line 7 to a known nozzle spray-dryer 8 to which drying air is supplied through a line 9 and the exhaust air is discharged through a line 10, while the dried coffee powder is discharged at the bottom through a line 11 and is in a known way led on to a packing room.

The extract obtained in the first extraction stage in the trough 1 is thus at disposal for use according to the invention. However, a certain small fraction of it may be mixed with the extract deriving from the second stage, as indicated by a line 12 which is shown as a dotted line and passes from the line 2 to the line 7.

It has been found that an extract of a particular good quality can be obtained if extract from the second extraction stage is used for the extraction in stage 1 as indicated by a line 12a which is shown as a dot-and-dash line and passes from the line 5 to the first extraction stage.

The extract deriving from the first extraction stage may be used in various ways. In the embodiment shown it is supplied to a concentration apparatus 13, which is preferably constructed as a known freeze-concentration apparatus in order that the loss of flavour from the valuable extract is to be as small as possible. From this freeze-concentration apparatus the concentrated extract is led through a line 14 to a deep-freezing device in which the extract is deep-frozen in the form of drops and from which it is discharged in the form of deep-frozen beads.

From these coffee concentrate beads a coffee can be made which tastes exactly like a coffee made in the traditional way in the household, when this coffee is best.

The beads are packed in a packing suited for deep-frozen products, and it is here possible to choose between different shapes and sizes. It may e.g. be possible to pack batches of different sizes intended for one, two, four and eight normal cups of coffee and, moreover, different series may be produced, which may be distinguished from each other by different colouring of the packing, containing the same quantity, but having different concentrations, viz. so that in this way from a batch intended for a certain number of cups of coffee a more or less strong coffee can be had depending on the series used.

EXAMPLE 1

572 kg/h of roasted and ground coffee beans of the Arabica-type with a water content of about 1.5 percent is supplied to the trough 1 together with 1,208 kg/h of water. The water, which is led in counter-flow, is introduced at a temperature of 90° C, and by means of the water jacket a heating is performed with water of 95° C, so that the extract leaving the trough 1 through the line 2 has a temperature of about 90° C. The residence time of the material in the trough 1 is about 40 minutes.

From the trough 1, 590 kg/h of extract is discharged through the line 2. This extract has a total solids content of 20 percent which amounts to 21 percent of the original quantity of dry matter. The residue from the extraction then amounts to 1,190 kg/h with a content of 31 percent of dry matter, i.e., the remaining 79 percent of the original quantity of dry matter.

This residue from the extraction is at a temperature of about 90° C supplied to the trough 4, to which an additional quantity of water of 1,260 kg/h is supplied at a temperature of 160° C. The heating is performed by means of the pressurized-water jacket with water of about 175° C, and the residence time is about 90 minutes.

From this trough 4, 1,080 kg/h of extract is discharged through the line 5.

The residue from the extraction, discharged through the line 6, amounts to 1,390 kg/h of coffee waste with a content of dry matter of 23 percent, i.e., about 56 percent of the original quantity of dry matter.

The extract discharged through the line 5 contains 12 percent total solids, i.e. 23.1 percent of the original quantity of dry matter. It has a pH-value of 4.7 and is led to the concentration apparatus 6 which is constituted by an evaporation apparatus, by which means there will, besides the concentration, occur a slight increase in the pH-value. The extract derived from the concentration apparatus 6 amounts to 370 kg/h with 35 percent total solids content and a pH-value of 4.8.

This extract is led to the spray-dryer 8, where the drying is performed by means of hot air supplied at a temperature of 260° C, and the outlet air has a temperature of 113° C. By the drying, 132 kg/h of coffee powder is obtained with a moisture content of 2 percent.

The product thus produced is an "instant" type powdered coffee with a pleasant flavour and with a pH-value (the so-called cup pH) of 4.9 which no doubt is due in part to the positive effects of the spraydrying upon the aroma in part to the increase in the pH-value caused by the evaporation as well as by the drying.

The extract from the trough 1, viz. 590 kg/h with a total solids content of 20 percent and a pH-value of 5.2 is concentrated in the freezeconcentration apparatus 13 to 414 kg/h of extract with a total solids content of 27 percent, which is frozen into drops, in the freezing apparatus 15, where the extract in the form of drops falls down into liquid nitrogen and is thereby deep-frozen into beads of the size of 2–5 millimetres.

EXAMPLE II 662 kg/h of roasted and ground coffee beans of the Robusta-type with a water content of about 5.4 percent is supplied to the trough 1 together with 1,445 kg/h of water. The water, which is led in counter-flow, is introduced at a temperature of 90° C, and by means of the water jacket with water of 99° C a heating is performed, so that the extract leaving the trough 1 through the line 2 has a temperature of about 95° C. The residence time in the trough is about 40 minutes.

From the trough 1, 827 kg/h of extract is discharged through the line 2. This extract has a total solids content of 18.5 percent, which amounts to 24.5 percent of the original quantity of dry matter in the coffee beans. The residue from the extraction then amounts to 1,280 kg/h with a content of 37 percent of dry matter, i.e., the remaining 75.5 percent of the original quantity of dry matter.

This residue from the extraction is at a temperature of about 95° C led to the trough 4, to which an additional quantity of water of 2,120 kg/h is supplied at a temperature of 160° C. The heating is performed by means of the pressurized-water jacket with water of 190° C, and the residence time is 90 minutes.

From this trough 4, 2,220 kg/h of extract is discharged through the line 5 with a total solids content of 9.2 percent, i.e., 32.5 percent of the original quantity of dry matter, and with a pH-value of 4.5.

The residue from the extraction, which is discharged through the line 6, amounts to 1,180 kg/h of coffee waste with a content of dry matter of 23 percent, i.e. 43 percent of the original quantity of dry matter.

The extract is through the line 5 led to the concentration apparatus 6 which also in this case is an evaporation apparatus, where it is concentrated to 515 kg/h of extract with a total solids content of 40 percent and a pH-value of 4.6.

In contradistinction to Example I, the line 12 is used in this case, through which 140 kg/h of the extract from the trough 1 is discharged, so that through the line 7 there is to the drying apparatus supplied a total of 657 kg/h of extract with a total solids content of 35 percent and a pH-value of 4.8.

The drying is performed by means of hot air which is supplied at a temperature of 260° C, and the outlet air has a temperature of 113° C. By the drying, 235 kg/h of coffee powder with a moisture content of 2 percent is obtained.

The product thus produced is an "instant" type powdered coffee with a pleasant flavour and with a cup pH of 4.9.

Thus it is evident that due to the admixture of part of the extract from the first extraction stage a satisfactorily high pH-value is obtained.

The remaining quantity of the extract from the trough 1, viz. 687 kg/h with a total solids content of 18.5 percent is concentrated in the freeze-concentration apparatus 13 into 457 kg/h of extract with a total solids content of 27 percent which is frozen in the form of drops in the freezing apparatus 15, where the extract in the form of drops falls down through liquid nitrogen and is thereby deep-frozen into beads of the size of 2–5 millimetres.

What we claim is:

1. A method for producing coffee products comprising the steps of extracting the roasted and ground coffee beans with a yield of 14–29 percent of the ground coffee beans in the extract phase to obtain a first extract, extracting from the remaining part of the coffee beans further at least 15 percent of the remaining solid coffee beans to obtain a second extract, cooling said first extract to a temperature below its eutectic point into frozen beads and placing the frozen beads in different packings for deepfreezer storage, and spray-drying the said second extract for the production of an instant coffee powder.

2. The method as claimed in claim 1, wherein said first extracting is with a yield of 20–25 percent of the ground coffee beans.

3. The method as claimed in claim 1, wherein said first extracting is to a total solids content in the extract below 20 percent and including the step of concentrating said extract to a total solids content between 15 percent and 40 percent before the cooling of the extract to a temperature below its eutectic point of solidification.

4. The method as claimed in claim 1, wherein said cooling is by feeding drops of extract of such size into liquid nitrogen that the frozen drops have a diameter of 2–5 millimeters.

5. A frozen coffee extract in the form of frozen beads placed in different packings for deepfreezer storage, with a total contents of solid coffee constituents between 15 percent and 40 percent, said constituents consisting essentially of the matter obtained by extracting roasted and ground coffee beans with a yield of only 14–29 percent of the ground coffee beans in the extract phase.

6. A frozen coffee extract in the form of frozen beads placed in different packings for deepfreezer storage, with a total contents of solid coffee constitutents between 15 percent and 40 percent, said constituents essentially of the matter obtained by extracting roasted and ground coffee beans with a yield between 20–25 percent of the ground coffee beans in the extract phase.

7. A frozen coffee extract as claimed in claim 5, in the form of frozen drops having a diameter of 2–5 millimeters.

8. A spray-dried instant coffee powder made by extracting roasted and ground coffee beans and spray-drying the extract, said powder consisting essentially of soluble coffee solids extracted from the roasted and ground coffee beans after the removal therefrom, by extraction, of 14–29 percent soluble coffee solids, the amount of coffee solids in the extract to be spray-dried corresponding to at least 15 percent of the total solid contents of the coffee beans.

9. The spray-dried instant coffee powder as claimed in claim 8, wherein the amount of coffee solids in the extract to be spray-dried corresponds to 20–35 percent of the total solid contents of the coffee beans.

10. The spray-dried instant coffee powder as claimed in claim 8, consisting essentially of soluble coffee solids extracted from the beans after extraction therefrom of 20–25 percent soluble coffee solids.

\* \* \* \* \*